United States Patent
Alasti et al.

(10) Patent No.: US 10,862,577 B2
(45) Date of Patent: Dec. 8, 2020

(54) DOPPLER COMPENSATION FOR A NON-TERRESTRIAL NETWORK

(71) Applicant: DISH Wireless L.L.C., Englewood, CO (US)

(72) Inventors: Mehdi Alasti, Reston, VA (US); Siddhartha Chenumolu, Broadlands, VA (US); Mariam Sorond, Reston, VA (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 16/401,528

(22) Filed: May 2, 2019

(65) Prior Publication Data

US 2020/0350983 A1 Nov. 5, 2020

(51) Int. Cl.
| | |
|---|---|
| H04B 7/185 | (2006.01) |
| H04B 7/195 | (2006.01) |
| G01S 19/05 | (2010.01) |
| H04L 5/00 | (2006.01) |
| G01S 19/25 | (2010.01) |
| G01S 19/40 | (2010.01) |

(52) U.S. Cl.
CPC .......... H04B 7/18513 (2013.01); G01S 19/05 (2013.01); G01S 19/254 (2013.01); G01S 19/40 (2013.01); H04B 7/195 (2013.01); H04L 5/0007 (2013.01)

(58) Field of Classification Search
CPC ... H04B 7/18513; H04B 7/195; H04L 5/0007; G01S 19/254; G01S 19/40; G01S 19/05
See application file for complete search history.

(56) References Cited

U.S. PATENT DOCUMENTS

| | | | | |
|---|---|---|---|---|
| 6,008,758 | A  * | 12/1999 | Campbell | H04B 7/208 |
| | | | | 342/358 |
| 2007/0021122 | A1 | 1/2007 | Lane et al. | |
| 2013/0143503 | A1* | 6/2013 | Li | H04W 24/02 |
| | | | | 455/63.1 |
| 2017/0347340 | A1* | 11/2017 | Haley | H04W 72/042 |

OTHER PUBLICATIONS

International Search Report and Written Opinion for PCT/US2020/030212 dated Sep. 2, 2020, all pages.
3GPP: "$3^{rd}$ Generation Partnership Project; Technical Specification Group Radio Access Network; Study on New Radio (NR) to support non terrestrial (Release 15)", Jun. 1, 2018, XP055724550, Retrieved from the Internet: URL:https://www3gpp.org/DynaRepoirt/38-series.htm [retrieved on Aug. 24, 2020] figures 5.3.1.3-1 paragraph [5.3.1.3].

* cited by examiner

*Primary Examiner* — Thai Nguyen
(74) *Attorney, Agent, or Firm* — Kilpatrick Townsend & Stockton LLP

(57) ABSTRACT

Various arrangements for compensating for Doppler shift on a non-terrestrial orthogonal frequency division multiplex (OFDM) network are presented. An absolute location of the UE instance may be determined. A relative velocity of the UE instance with respect to a satellite of the non-terrestrial OFDM network may be determined. A frequency delta due to Doppler shift may be determined. A transmission frequency at which an uplink OFDM symbol is to be transmitted to the satellite of the non-terrestrial OFDM network may be determined using the frequency delta.

20 Claims, 5 Drawing Sheets

DOPPLER COMPENSATION FOR A NON-TERRESTRIAL NETWORK

BACKGROUND

The amount of Doppler shift introduced to an electromagnetic signal can be defined by Equation 1.

$$\Delta F = F_0 * v * \frac{\cos(\theta)}{c} \quad \text{Eq. 1}$$

In Equation 1, the change in frequency ($\Delta F$) is equal to the nominal carrier frequency ($F_0$), multiplied by the relative velocity component of the objects receiving and transmitting an electromagnetic signal toward or away from each other, multiplied by the cosine of the angle between the objects divided by the speed of light. The greater the carrier frequency, the greater the change in frequency that will be caused by Doppler shift. Additionally, the greater the velocity, the greater the change in frequency.

The amount of Doppler shift introduced at lower frequencies and when an instance of user equipment, such as a cellular phone, is communicating with a stationary base station is relatively small and may not have a meaningful effect on frequency. However, at higher frequencies and in situations where the UE is moving at a high velocity (e.g., on a high-speed train or airplane), the amount of Doppler shift may no longer be negligible.

SUMMARY

Various arrangements for compensating for Doppler shift on a non-terrestrial network, such as an orthogonal frequency division multiplex (OFDM) network are presented herein. A user equipment (UE) instance may determine an absolute location of the UE instance. An angle between the UE instance and a satellite of the non-terrestrial OFDM network may be determined. A relative velocity of the UE instance may be determined with respect to a satellite of the non-terrestrial OFDM network. A frequency delta may be determined based on: a nominal uplink carrier frequency, the relative velocity, and the angle. A transmission frequency may be adjusted at which an uplink OFDM symbol is to be transmitted to the satellite of the non-terrestrial OFDM network using the frequency delta. The UE instance may transmit the uplink OFDM symbol at the adjusted transmission frequency.

Embodiments of such arrangements may include one or more of the following features: Determining the relative velocity of the UE instance with respect to the satellite of the non-terrestrial OFDM network can include determining a velocity of the UE instance with respect to the Earth using global navigation satellite system (GNSS) measurements. The satellite may be in a low earth orbit (LEO) or middle earth orbit (MEO). Determining the relative velocity of the UE instance with respect to the satellite of the non-terrestrial OFDM network can include accessing data indicative of an orbit and orbital velocity of the satellite. The satellite can be in a geostationary orbit. A frequency of a downlink OFDM symbol received from the satellite of the non-terrestrial OFDM network can be measured. A frequency shift between an expected downlink frequency and the measured frequency of the downlink OFDM symbol received from the satellite of the non-terrestrial OFDM network can be determined. Adjusting the transmission frequency at which the uplink OFDM symbol is to be transmitted to the satellite of the non-terrestrial OFDM network may be further based on the determined frequency shift between the expected downlink frequency and the measured frequency of the downlink OFDM symbol received from the satellite of the non-terrestrial OFDM network. The UE instance can communicate with the satellite of the non-terrestrial OFDM network using a 5G New Radio (NR) radio access technology (RAT). The UE instance may be a smartphone.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Orthogonal Frequency Divisional Multiplex (OFDM) is a form of digital signal modulation that allows narrowband channels to exist on subcarrier frequencies without guard bands being present between the subcarriers. For OFDM signal modulation to function properly, it is important for devices to precisely transmit on their allocated subcarrier frequencies in order to reduce interference and cross-talk among subcarrier frequencies. Avoiding such interference and cross-talk at low frequencies and when the devices communicating with each other are stationary or nearly stationary may not need to take into account the Doppler effect. However, as frequency and relative velocity increases, the Doppler effect can have a significant effect on the frequency.

In a non-terrestrial network (NTN), communication may occur between a user equipment (UE) instance and a satellite. If the satellite is in geostationary orbit, the satellite can effectively be treated as being stationary. However, the UE may be moving, possibly quickly. For instance, the UE may be temporarily located or permanently installed on a high-speed train or an airplane. For instance, UE may be used to provide WiFi to passengers so that they can access the Internet and other network-based services. If the satellite is in a non-geostationary orbit (e.g., LEO or MEO), the relative velocity component between the UE and the satellite may be significantly increased due to the orbit of the satellite around the earth. As a simple example, referring to Equation 1, at 30 GHz at LEO satellite's orbit may contribute a Doppler shift of 720 kHz.

A UE instance may be able to determine its location and velocity, such as using a global navigation satellite system (GNSS). The UE may further have access to data indicative of the location and orbit of a satellite. The UE may be able to determine the angle between the UE and the satellite and determine a relative velocity component either toward or away from the satellite along the Earth's surface. The UE may then be able to calculate the amount frequency shift that will be caused by the Doppler effect. The UE may then adjust its uplink transmission frequency, such as for the transmission of OFDM symbols, to compensate for the Doppler effect.

Additionally or alternatively, the UE instance may be able to compare the received frequency of a downlink signal from the satellite to an expected frequency. The different in frequency may be attributed to the Doppler effect. Using this change in frequency, the UE may be able to calculate the change in frequency that the Doppler effect will affect an uplink transmission, which may occur on a different frequency. This change in frequency can be combined with (e.g., averaged) with the change in frequency calculated based on position, velocity, and angle or may be used in lieu of this calculation.

Figure 1:
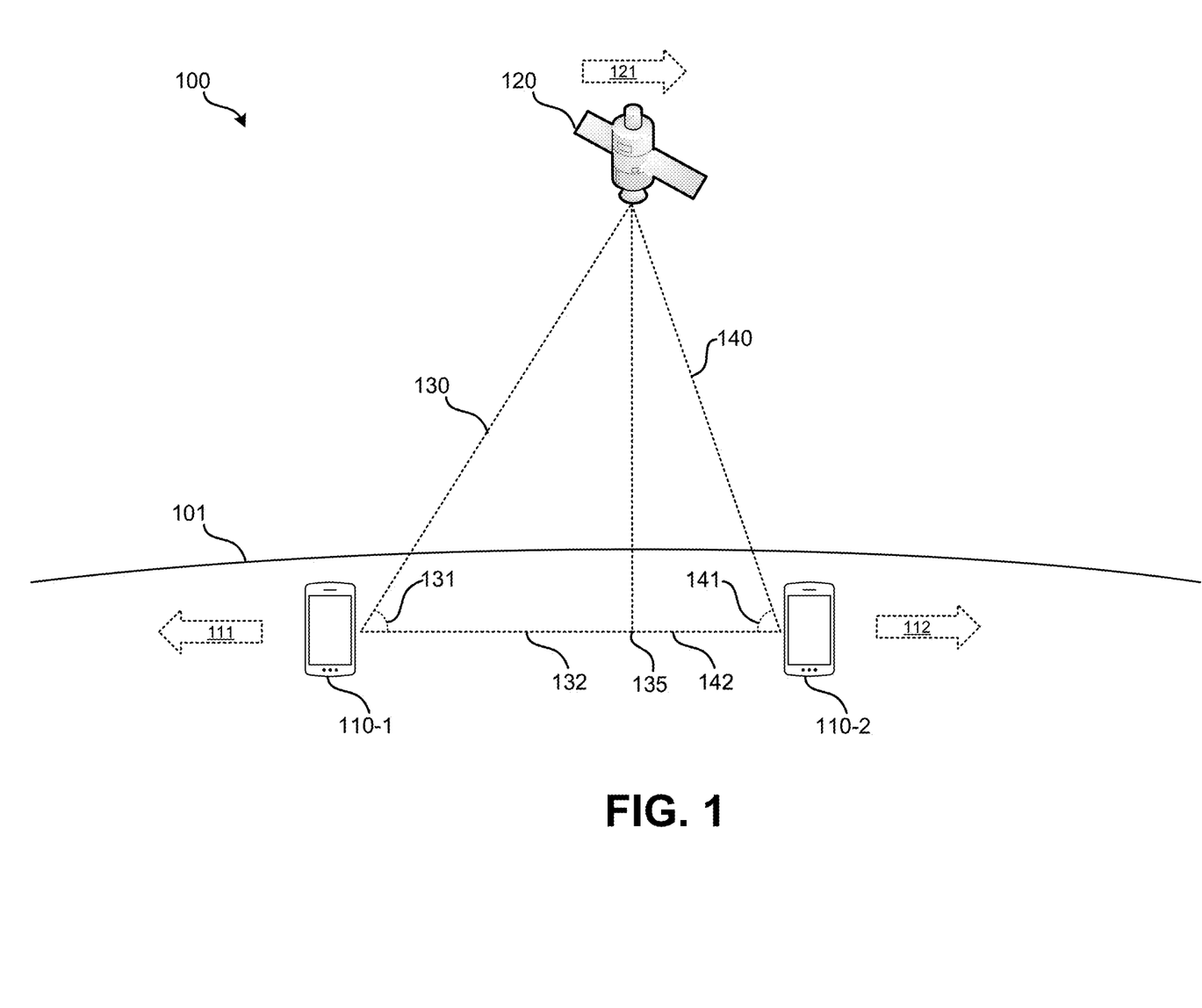
FIG. 1 illustrates an embodiment of an instance of UE moving relative to a satellite of a non-terrestrial network.

FIG. 1 illustrates an embodiment of a system 100 of UE instances 110 moving relative to a satellite 120 of a non-terrestrial network. The non-terrestrial network may use OFDM and may allow for bidirectional communication with the UE instance. In some embodiments, the non-terrestrial network may be a 5G NR (New Radio) network. In various embodiments, satellite 120 may be in geosynchronous orbit or may be in LEO or MEO. UE instances 110 (110-1, 110-2) may move in various directions approximately along the surface of Earth 101 relative to satellite 120. (While two UE instances 110 are illustrated, this number of UE is for example purposes only. A much greater number of UE may be communicating with satellite 120 in real-world implementations.) UE instances 110 may be smartphones, cellphones, tablet computers, or other computerized devices that communicate with a satellite that is part of a NTN. In some embodiments, a UE instance may be used to provide multiple other users with network access. For instance, mass-transit, such as a train or airplane, may have UE installed that enables WiFi or another form of network access for a large number of people. Such communication may be performed using 5G New Radio (NR) radio access technology (RAT). In an embodiment in which satellite 120 is in a geosynchronous orbit, satellite 120 can be treated as being stationary. In such embodiments, Doppler shift in uplink transmissions (that is, data transmissions from instances of UE to satellite 120) can be wholly attributed to movement of the particular UE instance. For example, if UE instance 110-1 is moving 600 km/hr west, it could result in a significant amount of Doppler shift in uplink communications compared to UE instance 110-2 that is moving 100 km/hr east.

Each of UE instances 110 may be capable of determining its absolute location. For instance, a global navigation satellite system (GNSS) module may be on-board each UE instance. Such a GNSS module may use the Global Positioning System (GPS), GLONASS, Galileo, Beidou, and/or other some other form of positioning system. Each UE instance may: 1) have access to data indicative of the location of satellite 120; 2) be able to determine its absolute location using the GNSS module; and 3) be able to determine its absolute speed (relative to the surface of the earth) such as using multiple GNSS measurements. Using this information, each UE instance can determine: 1) a relative velocity component indicative of velocity toward or away from the satellite along the earth's surface; and 2) angle 131. Angle 131 represents the difference between the uplink communication path 130 and approximately the earth's 101 surface (or, the direction to point 135, which is on the Earth's 101 surface directly below satellite 120. Angle 131 can be used as part of Equation 1. For instance, since UE instance 110-1 is displaced (distance 132) a greater distance from satellite 120 along the earth's 101 surface than UE 110-2 (distance 142), the movement of UE instance 110-1 can have a greater effect on Doppler shift than the movement of UE instance 110-2.

In a first set of embodiments, satellite 120 is in geostationary orbit. Therefore, each UE instance can calculate the amount of frequency shift based on the UE instance's: absolute location, relative velocity component toward or away from the satellite along the earth's surface, and the satellite's location. In a second set of embodiments, satellite 120 is in LEO or MEO orbit. In such embodiments, the orbit and velocity of satellite 120 needs to be taken into account to determine the amount of Doppler shift that the satellite's orbit around earth 101 will affect the uplink transmission. For instance, if velocity 111 of UE instance 110-1 is directly away from satellite 120 along earth's 101 surface and satellite 121 is moving in opposite direction of velocity 121, there can be significantly more Doppler shift on uplink transmissions than uplink transmissions from UE instance 110-2, which may be travelling at velocity 112 (which can be the same speed in an opposite direction as velocity 111). Since velocity 112 is in the same direction of velocity 121 of satellite 120, the velocities may partially cancel out the Doppler effect. UE instance 110-1 may determine a velocity component toward or away from point 135.

Figure 2:
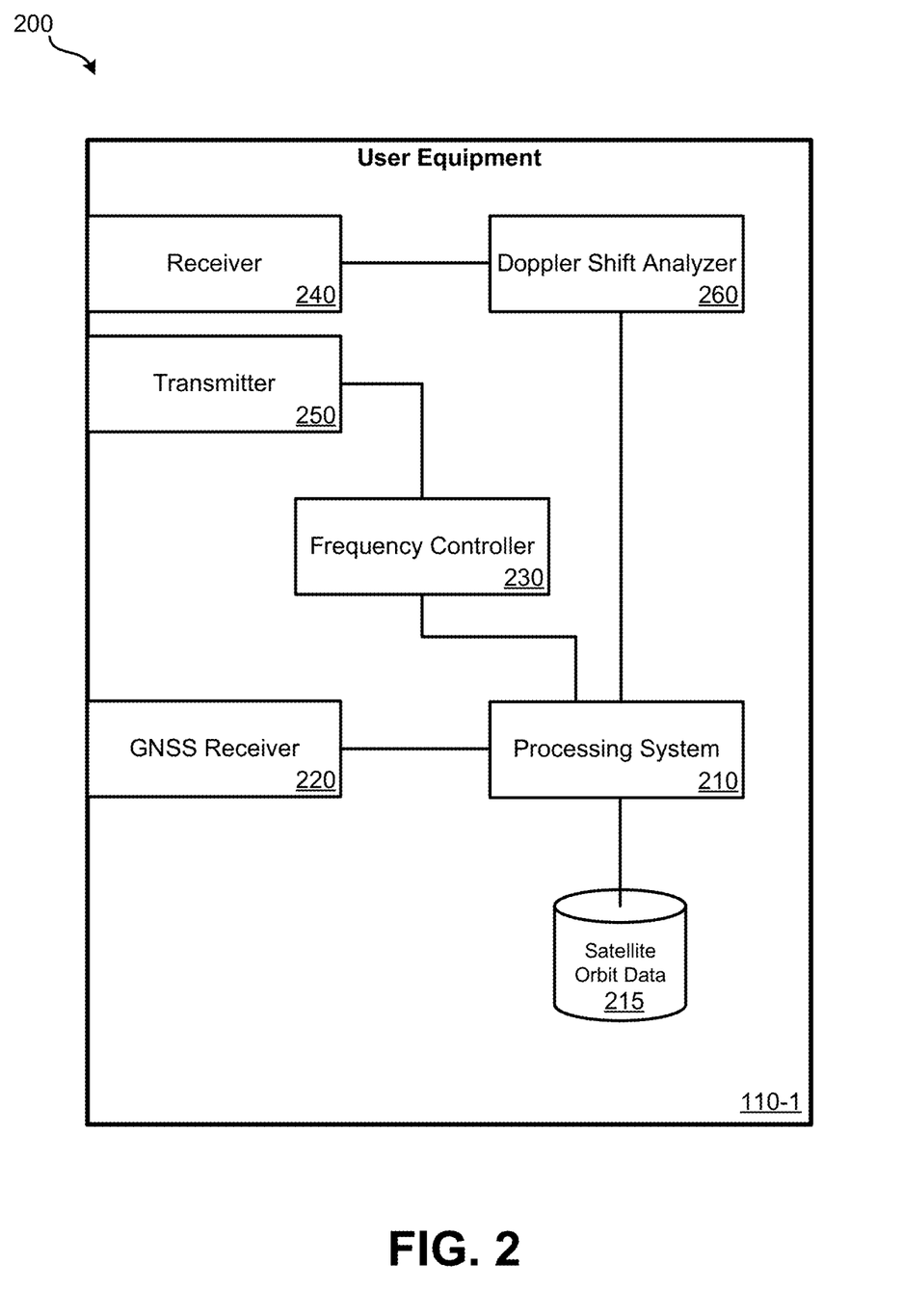
FIG. 2 illustrates an embodiment of an instance of UE that alters transmission frequency to compensate for Doppler shift.

FIG. 2 illustrates an embodiment of an instance of UE that alters transmission frequency to compensate for Doppler shift. The illustrated UE instance is UE instance 110-1 from FIG. 1. Other instances of UE may include the same or similar components. UE instance 110-1 may include: processing system 210; satellite orbit data 215; GNSS receiver 220; frequency controller 230; receiver 240; transmitter 250; and Doppler shift analyzer 260. Processing system 210 may include one or more processors. Processing system 210 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Processing system 210 may receive absolute position measurements from GNSS receiver 220 relative to Earth 101. Based on the absolute position measurements, processing system 210 may determine a velocity (which can be indicative of a speed and direction) of the instance of the UE relative to the Earth's surface. Processing system 210 may have access to a non-transitory processor-readable medium, which may store satellite orbit data 215. Satellite orbit data 215 may store the location of a geosynchronous satellite. Satellite orbit data 215 may store orbital information for LEO and/or MEO satellites that allows processing system 210 to calculate the current location and velocity of the satellite to which the uplink transmission is to be sent. Processing system 210 may use Equation 1 to calculate the amount of Doppler shift caused by movement of UE instance 110-1 and the satellite to which the uplink transmission is to be transmitted. The amount that frequency is to be adjusted (the frequency delta) or a modified carrier frequency may be output by processing system 210 to frequency controller 230. Frequency controller 230 may be configured to control the frequency at which uplink transmissions, such as OFDM symbols, are transmitted by transmitter 250.

Doppler shift analyzer 260 may receive downlink transmissions from the satellite via receiver 240. Receiver 240 may expect to receive downlink transmissions on a particular frequency. However, due to Doppler shift caused by movement of the satellite and/or UE instance 110-1, the downlink transmission may be received on a different frequency. Doppler shift analyzer 260 may determine the difference in frequency (or frequency delta) between the expected frequency on which the downlink transmission is to be received and the actual frequency at which the downlink transmission is received.

Processing system 210 may use the frequency delta observed by Doppler shift analyzer 260 in addition to or instead of the calculated Doppler shift. For instance, in some embodiments, the change in frequency determined by Doppler shift analyzer 260 may be averaged by processing system 210 with the calculated change in frequency. In other embodiments, processing system 210 may select between using the change in frequency received from Doppler shift analyzer 260 and the calculated change in frequency based on observed conditions. Feedback may be received from the satellite that indicates how well uplink data transmitted by UE instance 110-1 is compensating for the Doppler shift. If the uplink transmission has a sufficient error in frequency correction, processing system 210 may switch or adjust how it is using the change in frequency determined by Doppler shift analyzer 260 and the calculated change in frequency to compensate for the Doppler shift.

The Doppler shift on downlink communications may tend to cause less interference than the Doppler shift on uplink transmissions. Since all of the downlink transmissions originate from the same source (i.e., the satellite), each UE instance will observe all downlink transmissions shifted in the frequency domain. Since all downlink transmissions are shifted in the frequency domain, little or no interference among such downlink transmissions occurs.

Figure 3:
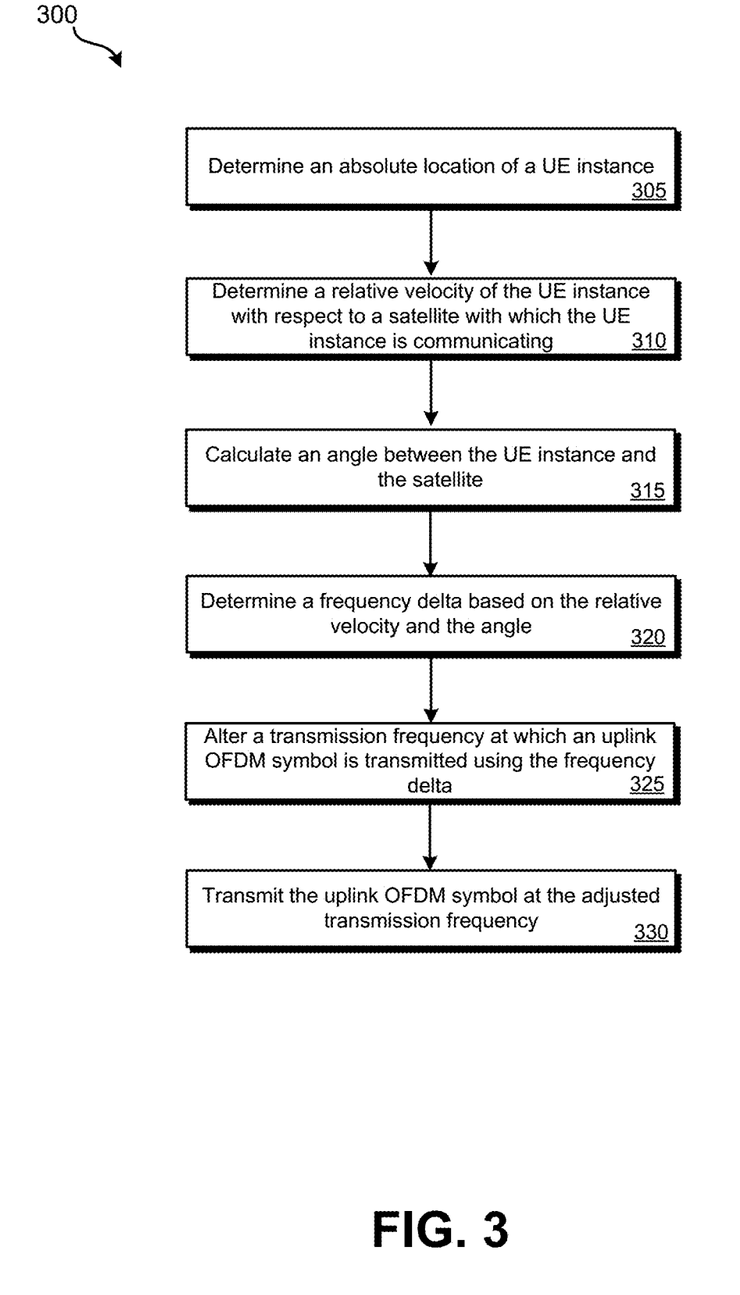
FIG. 3 illustrates an embodiment of a method for an instance of UE to compensate for Doppler Shift.

FIG. 3 illustrates an embodiment of a method 300 for an instance of UE to compensate for Doppler Shift. Method 300 may be performed by a UE instance, such as UE instance 110-1. The UE instance may include components as detailed in relation to FIG. 2. At block 305, a UE instance may determine its absolute location with respect to the Earth. This absolute position may be determined using a GNSS component.

At block 310, a relative velocity component of the UE instance with respect to the satellite with which the UE instance is about to or is already communicating may be determined or calculated. The relative velocity component can represent the velocity toward or away from a point on Earth directly below the satellite's location. If the satellite has a geosynchronous orbit, the satellite may be treated as being stationary. If the satellite is in a LEO or MEO orbit, the relative velocity component of the satellite towards or away from the UE instance may be added to (if in opposite directions) or subtracted from (if in the same direction) the UE's velocity component to determine a relative velocity component.

At block 315, an angle between the UE instance and the satellite may be determined. The angle may be between a direct path to the satellite (e.g., uplink communication path 130) and the point on the earth's surface directly below the satellite (e.g., point 135 in FIG. 1). The smaller the angle, the greater the effect of the relative velocity component of the Doppler shift on uplink transmissions as received by the satellite. To determine the angle, the location of the satellite may be needed by the UE instance. The UE instance may access locally-stored satellite orbit data or may access stored satellite data from a remote source, such as via a network.

At block 320, a frequency delta may be calculated by the UE instance using Equation 1. Equation 1 may be calculated by the UE instance using: use the relative velocity component at which the satellite and the UE are either moving towards or away from each other and the angle calculated at block 315 to determine a frequency delta.

At block 325, the transmission frequency at which an uplink data transmission, such as in OFDM symbol, is to be transmitted may be altered using the frequency delta. The frequency delta may be used to either increase the transmission frequency or decrease the transmission frequency. The transmission frequency may be increased if the relative velocity component indicates that the UE instance and satellite are moving away from each other; and the transmission frequency may be decreased if the relative velocity component indicates that the UE instance and satellite are moving toward each other.

At block 330, the uplink OFDM symbol may be transmitted using the adjusted transmission frequency. By the frequency having been adjusted using the calculated frequency delta, when the subcarrier on which the OFDM symbol was transmitted is received by the satellite, the Doppler shift may be compensated for such that little to no interference with other subcarrier transmissions by other instances of UE occurs. Therefore, the satellite may effectively receive the uplink transmission at the nominal subcarrier frequency (without any perceived Doppler shift).

Figure 4:
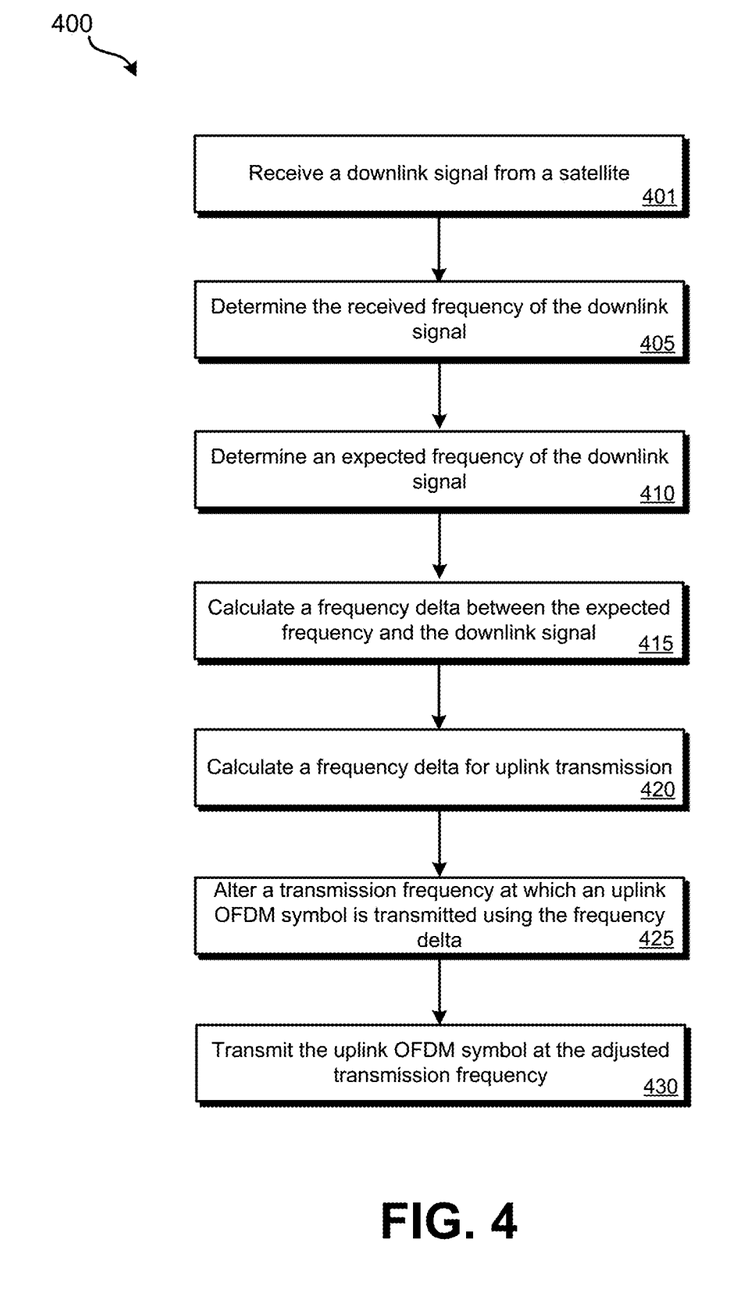
FIG. 4 illustrates another embodiment of a method for an instance of UE to compensate for Doppler Shift based on the amount Doppler shift measured in a downlink signal.

FIG. 4 illustrates another embodiment of a method for an instance of UE to compensate for Doppler Shift based on the amount Doppler shift measured in a downlink signal. Method 400 may be performed by a UE instance, such as UE instance 110-1. The UE instance may include components as detailed in relation to FIG. 2. Method 400 may be performed instead of or in addition to method 300. At block 401, a downlink signal may be received from a satellite. At block 405, the received frequency of the downlink signal may be determined by the UE instance. At block 410, the UE instance may determine the frequency at which it expected to receive the downlink signal. For instance, the downlink message may include data indicating the frequency at which the data was transmitted or the UE instance may have data stored indicating the frequency at which downlink data is transmitted by the satellite. At block 415, a frequency delta between the expected frequency and the received frequency may be calculated by the UE instance.

Using Equation 2, which is equivalent to Equation 1, the value of $$\left(v * \frac{\cos(\theta)}{c}\right)$$

can be determined using the frequency delta determined at block 415 and the nominal carrier frequency.

$$\left(v * \frac{\cos(\theta)}{c}\right) = \frac{\Delta F}{F_0} \quad \text{Eq. 2}$$

Using the value of $$\left(v * \frac{\cos(\theta)}{c}\right)$$

calculated from Equation 2, Equation 1 can then be re-evaluated using the nominal carrier frequency for the uplink OFDM symbol transmission to determine the frequency delta to compensate for the Doppler shift of the uplink transmission at block 420. Since the value of $$\left(v * \frac{\cos(\theta)}{c}\right)$$

is based on an actual downlink transmission, the value may be more accurate than if calculated by the UE instance based on a determined relative velocity component and determined angle. Further, in such embodiments, the UE instance may not need to determine its own velocity or absolute position.

At block 425, the transmission frequency at which an uplink data transmission, such as an OFDM symbol, is to be transmitted may be altered using the frequency delta calculated at block 420. The frequency delta may be used to either increase the transmission frequency or decrease the transmission frequency. The transmission frequency may be increased if the relative velocity component indicates that the UE instance and satellite are moving away from each other; and the transmission frequency may be decreased if the relative velocity component indicates that the UE instance and satellite are moving toward each other. At block 425, the uplink transmission, such as an OFDM symbol, may be transmitted using the adjusted transmission frequency. By the frequency having been adjusted using the calculated frequency delta based on the measured Doppler shift of the downlink transmission, the Doppler shift may be compensated for such that little to no interference with other subcarrier transmissions by other instances of UE occurs.

Figure 5:
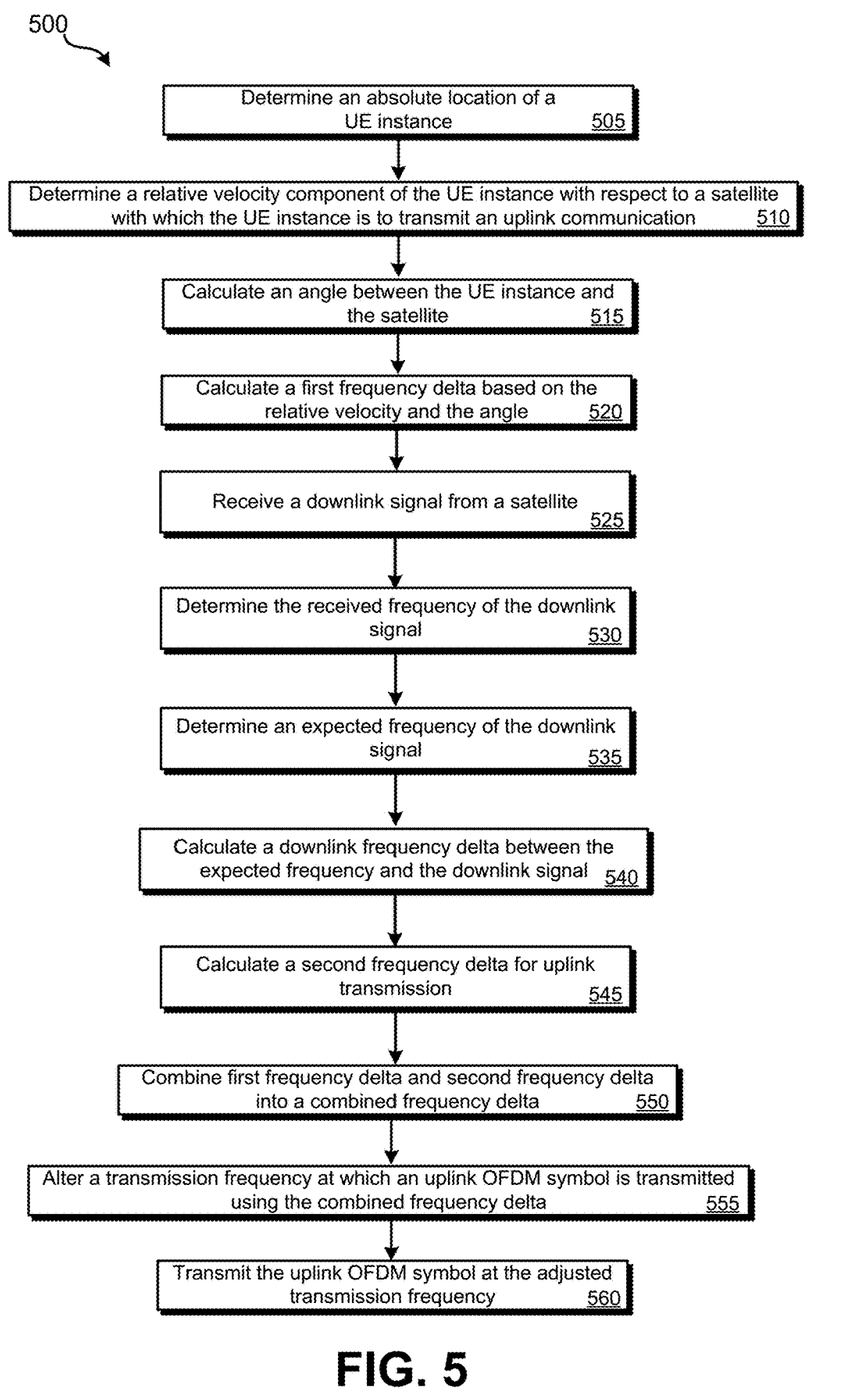
FIG. 5 illustrates an embodiment of a method for a UE instance to compensate for Doppler shift based on the amount Doppler shift measured in a downlink signal and a frequency delta based on calculated velocity, position, and angle.

FIG. 5 illustrates an embodiment of a method for a UE instance to compensate for Doppler shift based on the amount Doppler shift measured in a downlink signal and a frequency delta based on calculated velocity, position, and angle. At block 505, a UE instance may determine its absolute location with respect to the Earth. This absolute position may be determined using a GNSS component.

At block 510, a relative velocity component of the UE instance with respect to the satellite with which the UE instance is about to or is already communicating may be determined or calculated. The relative velocity component can represent the velocity toward or away from a point on Earth directly below the satellite's location. If the satellite has a geosynchronous orbit, the satellite may be treated as being stationary. If the satellite is in a LEO or MEO orbit, the relative velocity component of the satellite towards or away from the UE instance may be added to (if in opposite directions) or subtracted from (if in the same direction) the UE's velocity component to determine a relative velocity component.

At block 515, an angle between the UE instance and the satellite may be determined. The angle may be between a direct path to the satellite (e.g., uplink communication path 130) and the point on the earth's surface directly below the satellite (e.g., point 135 in FIG. 1). The smaller the angle, the greater the effect of the relative velocity component of the Doppler shift on uplink transmissions as received by the satellite. To determine the angle, the location of the satellite may be needed by the UE instance. The UE instance may access locally-stored satellite orbit data or may access stored satellite data from a remote source, such as via a network.

At block 520, a first frequency delta may be calculated by the UE instance using Equation 1. Equation 1 may be calculated by the UE instance using: use the relative velocity component at which the satellite and the UE are either moving towards or away from each other and the angle calculated at block 515 to determine a frequency delta.

At block 525, a downlink signal may be received from a satellite. At block 530, the received frequency of the downlink signal may be determined by the UE instance. At block 535, the UE instance may determine the frequency at which it expected to receive the downlink signal. For instance, the downlink message may include data indicating the frequency at which the data was transmitted or the UE instance may have data stored indicating the frequency at which downlink data is transmitted by the satellite. At block 540, a downlink frequency delta between the expected frequency and the received frequency may be calculated by the UE instance.

At block 545, using Equation 2 as detailed in relation to method 40o, me value of $$\left(v * \frac{\cos(\theta)}{c}\right)$$

can be used to calculate Equation 1 for the nominal carrier frequency for the uplink OFDM symbol transmission to determine the second frequency delta to compensate for the Doppler shift of the uplink transmission.

At block 550, either the first frequency delta or the second frequency delta is selected to use to adjust the uplink transmission frequency (e.g., of the OFDM symbol). In some embodiments, the first frequency delta and the second frequency delta are averaged together or are otherwise combined. In some embodiments, a weighting is used. For instance, feedback may be occasionally received from the satellite that indicates an amount of error in the frequency of uplink transmissions from the UE instance. Based on the feedback data, the weighting of the first frequency delta compared to the second frequency delta can be adjusted. In other embodiments, the feedback data may indicate whether the calculated first frequency delta or the calculated second frequency delta should be used to adjust uplink transmissions.

At block 555, the transmission frequency at which an uplink data transmission, such as an OFDM symbol, is to be transmitted may be altered using the combined frequency delta at block 550. The frequency delta may be used to either increase the transmission frequency or decrease the transmission frequency. The transmission frequency may be increased if the relative velocity component indicates that the UE instance and satellite are moving away from each other; and the transmission frequency may be decreased if the relative velocity component indicates that the UE instance and satellite are moving toward each other. At block 560, the uplink transmission, such as an OFDM symbol, may be transmitted using the adjusted transmission frequency. By the frequency having been adjusted using the calculated frequency delta based on the measured Doppler shift of the downlink transmission, the Doppler shift may be compensated for such that little to no interference with other subcarrier transmissions by other instances of UE occurs.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for compensating for Doppler shift on a non-terrestrial orthogonal frequency division multiplex (OFDM) network, the method comprising:
   determining, by a processing system of a user equipment (UE) instance, an absolute location of the UE instance, wherein the UE instance comprises: a transmitter, a receiver, and the processing system that comprises one or more processors;
   determining, by the processing system of the UE instance, for an angle between the UE instance and a satellite of the non-terrestrial OFDM network;
   determining, by the processing system of the UE instance, a relative velocity of the UE instance with respect to the satellite of the non-terrestrial OFDM network;
   determining, by the processing system of the UE instance, a frequency delta based on: a nominal uplink carrier frequency, the relative velocity, and the angle; and
   adjusting, by the processing system of the UE instance, a transmission frequency at which an uplink OFDM symbol is to be transmitted to the satellite of the non-terrestrial OFDM network using the frequency delta; and
   transmitting, by the transmitter of the UE instance the uplink OFDM symbol at the adjusted transmission frequency.

2. The method for compensating for Doppler shift on the non-terrestrial OFDM network of claim 1, wherein determining the relative velocity of the UE instance with respect to the satellite of the non-terrestrial OFDM network comprises:
   determining a velocity of the UE instance with respect to the Earth using global navigation satellite system (GNSS) measurements.

3. The method for compensating for Doppler shift on the non-terrestrial OFDM network of claim 2, wherein the satellite is in a low earth orbit (LEO) or middle earth orbit (MEO).

4. The method for compensating for Doppler shift on the non-terrestrial OFDM network of claim 3, wherein determining the relative velocity of the UE instance with respect to the satellite of the non-terrestrial OFDM network comprises:
   accessing data indicative of an orbit and orbital velocity of the satellite.

5. The method for compensating for Doppler shift on the non-terrestrial OFDM network of claim 1, wherein the satellite is in a geostationary orbit.

6. The method for compensating for Doppler shift on the non-terrestrial OFDM network of claim 1, further comprising:
   measuring a frequency of a downlink OFDM symbol received from the satellite of the non-terrestrial OFDM network.

7. The method for compensating for Doppler shift on the non-terrestrial OFDM network of claim 6, further comprising:
   determining a frequency shift between an expected downlink frequency and the measured frequency of the downlink OFDM symbol received from the satellite of the non-terrestrial OFDM network.

8. The method for compensating for Doppler shift on the non-terrestrial OFDM network of claim 7, wherein adjusting the transmission frequency at which the uplink OFDM symbol is to be transmitted to the satellite of the non-terrestrial OFDM network is further based on the determined frequency shift between the expected downlink frequency and the measured frequency of the downlink OFDM symbol received from the satellite of the non-terrestrial OFDM network.

9. The method for compensating for Doppler shift on the non-terrestrial OFDM network of claim 1 wherein the UE instance communicates with the satellite of the non-terrestrial OFDM network using a 5G New Radio (NR) radio access technology (RAT).

10. The method for compensating for Doppler shift on the non-terrestrial OFDM network of claim 9 wherein the UE instance is a smartphone.

11. A system for compensating for Doppler shift on a non-terrestrial orthogonal frequency division multiplex (OFDM) network, the system comprising:
   a satellite that is part of the non-terrestrial OFDM network; and
   a user equipment (UE) instance, comprising:
      a transmitter;
      a receiver; and
      a processing system comprising one or more processors, configured to:
         determine an absolute location of the UE instance;
         determine for an angle between the UE instance and the satellite of the non-terrestrial OFDM network;
         determine a relative velocity of the UE instance with respect to the satellite of the non-terrestrial OFDM network;
         determine a frequency delta based on: a nominal uplink carrier frequency, the relative velocity, and the angle;
         adjust a transmission frequency at which an uplink OFDM symbol is to be transmitted to the satellite of the non-terrestrial OFDM network using the frequency delta; and
         cause the uplink OFDM symbol to be transmitted at the adjusted transmission frequency to the satellite.

12. The system for compensating for Doppler shift on the non-terrestrial OFDM network of claim 11, wherein the processing system of the UE instance being configured to determine the relative velocity of the UE instance with respect to the satellite of the non-terrestrial OFDM network comprises the processing system being configured to:
   determine a velocity of the UE instance with respect to the Earth using global navigation satellite system (GNSS) measurements.

13. The system for compensating for Doppler shift on the non-terrestrial OFDM network of claim 12, wherein the satellite is in a low earth orbit (LEO) or middle earth orbit (MEO).

14. The system for compensating for Doppler shift on the non-terrestrial OFDM network of claim 13, wherein the processing system of the UE instance is configured to determine the relative velocity of the UE instance with respect to the satellite of the non-terrestrial OFDM network comprises the processing system of the UE instance being configured to:
   access data indicative of an orbit and orbital velocity of the satellite.

15. The system for compensating for Doppler shift on the non-terrestrial OFDM network of claim 11, wherein the satellite is in a geostationary orbit.

16. The system for compensating for Doppler shift on the non-terrestrial OFDM network of claim 11, wherein the UE instance is further configured to:
   measure a frequency of a downlink OFDM symbol received from the satellite of the non-terrestrial OFDM network.

17. The system for compensating for Doppler shift on the non-terrestrial OFDM network of claim 16, wherein the instance of UE is further configured to:
   determining a frequency shift between an expected downlink frequency and the measured frequency of the downlink OFDM symbol received from the satellite of the non-terrestrial OFDM network.

18. The system for compensating for Doppler shift on the non-terrestrial OFDM network of claim 17, wherein the processing system of the UE instance being configured to adjust the transmission frequency at which the uplink OFDM symbol is to be transmitted to the satellite of the non-terrestrial OFDM network is further based on the determined frequency shift between the expected downlink frequency and the measured frequency of the downlink OFDM symbol received from the satellite of the non-terrestrial OFDM network.

19. The system for compensating for Doppler shift on the non-terrestrial OFDM network of claim 11 wherein the UE instance communicates with the satellite of the non-terrestrial OFDM network using a 5G New Radio (NR) radio access technology (RAT).

20. The system for compensating for Doppler shift on the non-terrestrial OFDM network of claim 19 wherein the UE instance is a smartphone.

* * * * *

UNITED STATES PATENT AND TRADEMARK OFFICE
CERTIFICATE OF CORRECTION

| | |
|---|---|
| PATENT NO. | : 10,862,577 B2 |
| APPLICATION NO. | : 16/401528 |
| DATED | : December 8, 2020 |
| INVENTOR(S) | : Mehdi Alasti, Siddhartha Chenumolu and Mariam Sorond |

It is certified that error appears in the above-identified patent and that said Letters Patent is hereby corrected as shown below:

In the Claims

In Claim 1, Column 10, Line 2, please delete the word "for"

In Claim 11, Column 11, Line 15, please delete the word "for"

Signed and Sealed this
Nineteenth Day of July, 2022

Katherine Kelly Vidal
*Director of the United States Patent and Trademark Office*